Figure 1:
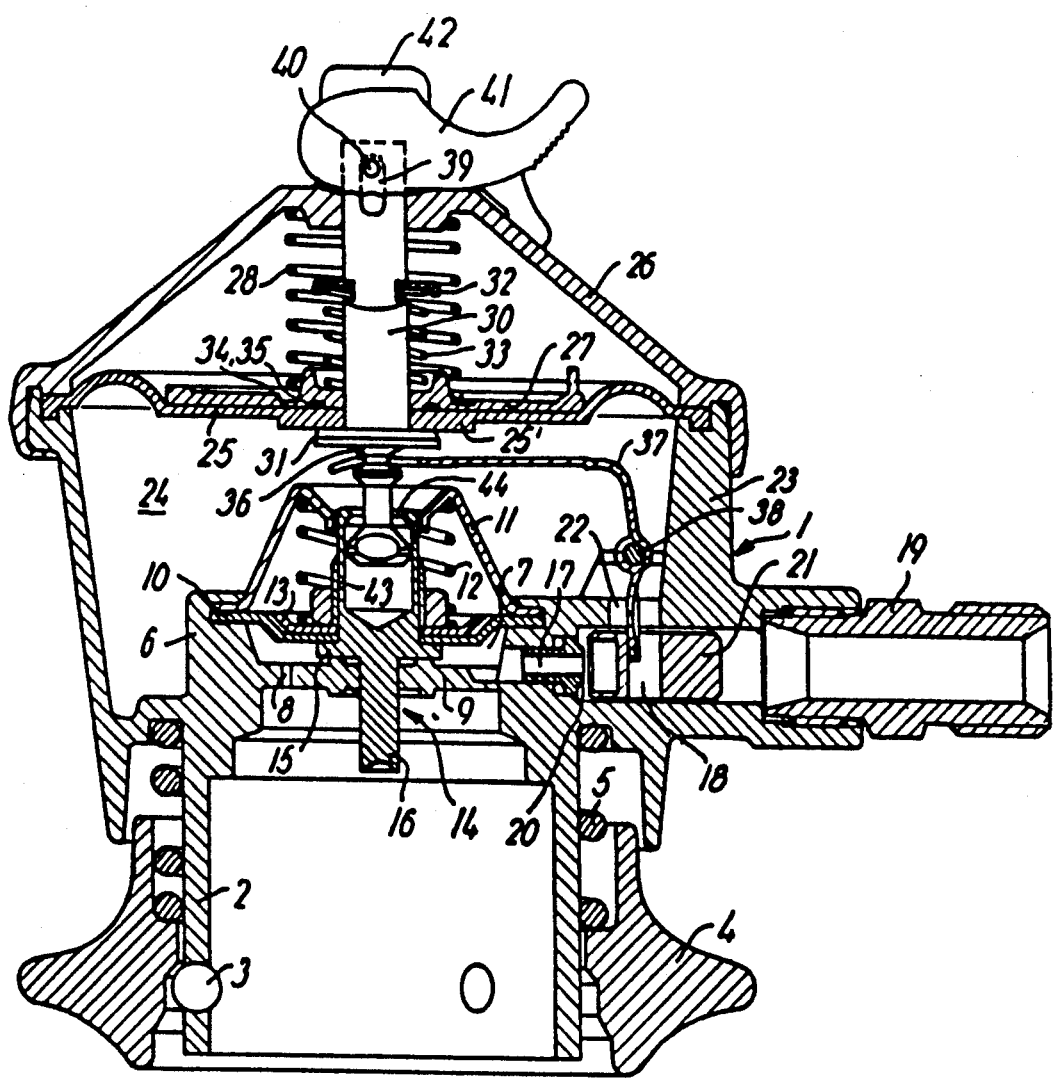

United States Patent [19]

Hansen

[11] Patent Number: 5,186,208
[45] Date of Patent: Feb. 16, 1993

[54] TWO-STEP REDUCTION VALVE ESPECIALLY FOR GAS CYLINDERS

[75] Inventor: Frits P. U. Hansen, Rungsted Kyst, Denmark

[73] Assignee: Kosan Teknova A/S, Niva, Denmark

[21] Appl. No.: 724,819

[22] Filed: Jul. 2, 1991

[30] Foreign Application Priority Data

Jul. 3, 1990 [DK] Denmark .............................. 1595/90

[51] Int. Cl.$^5$ ............................................ F16K 31/12
[52] U.S. Cl. .............................. 137/505.12; 137/315; 403/353; 251/86
[58] Field of Search ............... 403/353; 29/898.07; 137/315, 505.12, 495; 251/86

[56] References Cited

U.S. PATENT DOCUMENTS

| 1,526,512 | 2/1925 | Teten . | |
|---|---|---|---|
| 2,241,747 | 5/1941 | Shaw | 403/353 |
| 2,892,608 | 6/1959 | Collins | 251/86 |
| 3,043,332 | 7/1962 | Henriques et al. | 137/505.12 |
| 3,472,269 | 10/1969 | Scholle | 251/291 |
| 3,589,756 | 6/1971 | Pruvot | 403/353 |
| 3,892,258 | 7/1975 | Hendrick | 137/461 |
| 4,004,425 | 1/1977 | Pickering | 403/353 |
| 4,550,746 | 11/1985 | Hansen et al. | 137/461 |

FOREIGN PATENT DOCUMENTS

| 89831 | 10/1960 | Denmark . | |
|---|---|---|---|
| 150026 | 2/1985 | Denmark . | |
| 0007117 | 1/1980 | European Pat. Off. . | |
| 717535 | 2/1942 | Fed. Rep. of Germany | 403/353 |
| 2523845 | 5/1975 | Fed. Rep. of Germany . | |
| 1396336 | 3/1965 | France . | |

Primary Examiner—A. Michael Chambers
Attorney, Agent, or Firm—Foley & Lardner

[57] ABSTRACT

A two-stage reduction valve for gaseous fluids consists of a high-pressure assembly with a high-pressure diaphragm (10) actuating a valve member disposed in the throat of a gas cylinder and of a low-pressure assembly with a likewise diaphragm-operated valve member (21) positioned in a gas duct (18) extending from the high-pressure assembly. A closing rod (30) connected with an operating handle (41) is restrictedly displaceably connected with a diaphragm spindle (14) firmly connected with the high-pressure diaphragm (10) and has at its upper end an essentially cylindrical bore (43) to displaceably receive the lower end of the closing rod (30). The upward circular mouth (44) of the bore (43) has a reduced diameter and the closing rod (30) has at its lower end a head (45) with a width larger than said reduced diameter but with such a shape that it may be inserted into the bore (43) through the mouth (44) of the bore with the closing rod (30) inclined in relation to the axis of the diaphragm spindle (14), but when inserted it is prevented from being pulled out from the bore.

9 Claims, 1 Drawing Sheet

TWO-STEP REDUCTION VALVE ESPECIALLY FOR GAS CYLINDERS

The invention relates to a two-stage reduction valve for gaseous fluids consisting of a high-pressure assembly with a high-pressure diaphragm acting on a valve member preferably disposed in the throat of a gas cylinder, and a low-pressure assembly consisting of a valve member likewise diaphragm-operated and which is positioned in a gas duct extending from the high-pressure assembly, said diaphragm being exposed to the pressure in the duct downstream of the valve seat of the low-pressure valve, and in which reduction valve a closing rod connected with an operating handle is restrictedly displaceably connected with a diaphragm spindle firmly connected with the high-pressure diaphragm, which diaphragm spindle in the opening position with its lower end actuates the valve member accommodated in the cylinder throat, and at its upper end has a substantially cylindrical bore displaceably receiving the lower end of the closing rod so that the high-pressure valve in one position of the operating handle and thus of the closing rod is forcibly kept closed independent of the high-pressure diaphragm, while in another position of the operating handle the high-pressure valve may be moved by the high-pressure diaphragm, the closing rod being firmly connected with the valve control mechanism of the low-pressure assembly and being further so connected with the low-pressure valve member that said member is forced into the closing position when the closing rod is in the closing position, the upward facing circular mouth of said bore in the diaphragm spindle having a reduced diameter and the closing rod at its lower end having a head with a width larger than said reduced diameter.

In a reduction valve of the above type disclosed in U.S. Pat. No. 4,550,746 said connection between the closing rod and the low-pressure valve member entails an improved security against leakage of gas in the closed position of the valve, as any gas leaking through leakages in the closed high-pressure valve is confined within the high-pressure diaphragm chamber, i.e. the space between the high-pressure valve and the high-pressure diaphragm.

The restrictedly displaceable connection of the closing rod with the valve control mechanism of the high-pressure assembly and the fixed connection with the valve control mechanism of the low-pressure assembly not only results in free movability of the two valve control mechanisms in the open position of the valve but also aims at simplifying the structure.

In the valve design known from said U.S. patent the restrictedly displaceable connection between the closing rod and the diaphragm spindle has been established by passing a pin connected with the diaphragm spindle at the mouth of the cylindrical bore through an oblong hole in the proximity of the lower end of the closing rod.

In spite of the simplicity aimed at, said design results in that the assembling becomes complicated and cannot be automated, because the pin may only be connected with the diaphragm spindle after being positioned in the oblong hole in the closing rod.

Moreover, there is a certain risk that the valve may be blocked by said pin.

With the view of eliminating this drawback it has been suggested providing said restrictedly displaceable connection by means of some sort of bayonet coupling between the lower end of the closing rod and the bore of the diaphragm spindle, the lower end of the closing rod forming a shallow plug part of the coupling to be inserted into a keyholelike cutout at the mouth of the bore of the diaphragm spindle.

With the above design the assembling requires a specific angular orientation of the closing rod and the diaphragm spindle for the insertion of the closing rod and a subsequent turning movement of the two members in order to ensure the bayonet mesh, causing that the assembling in this case too is difficult to automatize.

Moreover, there is a risk that the closing rod and diaphragm spindle may get out of the bayonet mesh by merely a slight mutual turning when using the valve.

According to the present invention a considerable simplification of the assembling is obtained so that the assembling may be automatized without substantial complications in preparation of robot control and an improved security against malfunction due to failing engagement between the closing rod and the diaphragm spindle in that the head of the closing rod has such a shape that it may be inserted into a bore through the mouth of the bore when the closing rod is inclined in relation to the axis of the diaphragm spindle, but when in inserted position and with the closing rod coaxial with the bore it is prevented from being pulled out therefrom.

With the above design of the bore of the diaphragm spindle with a narrowed circular mouth and with the design of the head at the lower end of the closing rod, it is obtained that the two parts may be assembled in an arbitrarily mutual angular position and the inclined position of the closing rod required for the assembling operation is easily effected by robot control.

Due to the fixed guidance of the diaphragm spindle in the fully assembled valve it is in practice not possible to remove the closing rod from its coaxial relationship with the diaphragm spindle and thus there is no risk that the closing rod disengages the diaphragm spindle.

In a preferred embodiment the head of the closing rod has the shape of a hexagonal member in which a diagonal extends perpendicular to the axis of the closing rod and has a length larger than the diameter of the mouth of the bore while the shortest linear distance between two opposite sides that are not parallel to said diagonal is smaller than said diameter of the mouth.

A further simplification of the assembling may be obtained in that a diaphragm seat for the low-pressure diaphragm is formed integrally with the closing rod. This makes it possible to avoid the soldering of the diaphragm seat to the closing rod generally used in known designs of the reduction valve and a permanent firm connection between the closing rod and the low-pressure diaphragm is ensured.

In a further advantageous embodiment the closing rod is designed so that below the diaphragm seat it has a narrowing for receiving a bifurcated end of an angularly bent leaf spring member through which the closing rod is connected with the low-pressure member, whereby the provision of the linkage between the closing rod and the low-pressure valve member is simplified.

A safe fixing and securing of the low-pressure diaphragm in relation to the closing rod and thus also an improved security against leakage that might incidentally be caused by displacement of the resilient low-pressure diaphragm in relation to the closing rod, is obtained by keeping the low-pressure diaphragm firmly tightened against the valve seat by a diaphragm disc positioned against the upper side of the diaphragm and in the underside of which grooves are provided to receive beads protruding from the upper side of the diaphragm.

The invention will now be explained in detail with reference to the drawings, in which FIG. 1 is a vertical sectional view of an embodiment of a two-stage reduction valve according to the invention, and FIG. 2 on a larger scale illustrates the interconnection between a closing rod and a membrane spindle.

The valve housing 1 is designed to be detachably arranged above a valve bushing (not shown) permanently secured in the opening of a gas cylinder, a downward directed circumferential skirt 2 of the valve housing encircling the upper part of the valve bushing and being secured thereto by means of a number of balls 3 which are pressed into engagement with a circumferential recess externally of the valve bushing by means of a slide collar 4 urged downwards by a spring 5.

In an upward extension of the skirt 2 a wall 6 surrounds a high-pressure diaphragm chamber 7 which is closed towards the valve by means of a wall 9 provided with flow openings 8 and upwards by a high-pressure diaphragm 10 which along its external circumference is clamped to the wall 6 by means of a spring casing 11 accommodating a diaphragm spring 12 inserted between the upper part of casing 11 and a diaphragm disc 13 positioned against the upper side of the high-pressure diaphragm 10.

The high-pressure diaphragm 10 is coaxially secured on a diaphragm spindle 14 which below diaphragm 10 is provided with a diaphragm seat 15 to support said diaphragm and whose downward projecting end 16 in the working position of the reduction valve actuates a stem (not shown) in the valve bushing to open against the force from a spring attempting to close the valve. This enables the stem (not shown) comprising a high-pressure valve member, to be controlled in the working position by the high-pressure diaphragm 10 with spring 12 in cooperation with the spring force acting on the stem.

An outlet duct 17 extends from the high-pressure diaphragm chamber 7 through wall 6 and opens into a large diameter gas duct 18 into which a hose coupling 19 has been tightly screwed. The mouth of the outlet duct 17 in gas duct 18 is formed as a valve seat 20 and may be closed by means of a low-pressure valve member 21 longitudinally displaceable in gas duct 18.

In line with the low-pressure valve member 21 gas duct 18 has an opening 22 to a low-pressure diaphragm chamber 24 provided within a wall section 23 of valve housing 1 and which is closed downwards by wall 6 and high-pressure diaphragm 10 with spring casing 11, and upwards by a low-pressure diaphragm 25. This latter diaphragm is along its circumference clamped between the upper edge of wall section 23 and a spring casing 26, a low-pressure diaphragm spring 28 being inserted between the upper portion of said spring casing and a diaphragm disc 27 abutting on the upper part of diaphragm 25.

A closing rod 30 formed in one piece with a diaphragm seat 31 to provide a support for the diaphragm 25 is displaceably passed through the low-pressure diaphragm 25 which has a central thickening 25'. By means of a safety spring 33 tightened between the diaphragm disc 27 and a spring disc the diaphragm 25 is pressed into close abutment against diaphragm seat 31, but if the pressure in the low-pressure diaphragm chamber 24 exceeds a preset limit it will be capable of raising diaphragm 25 from seat 31 not only against the action exerted by diaphragm spring 28 but also against the action from safety spring 33 so that gas may escape through the orifice of diaphragm 25 around closing rod 30.

In order to prevent diaphragm 25 from being laterally displaced from its normal coaxial positioning in relation to closing rod 30, diaphragm 25 may at its upper side be provided with one or more circumferential beads 34 for engagement with grooves 35 in the underside of diaphragm disc 27.

Below membrane seat 31 the closing rod 30 has a narrowing 36 for receiving in a manner facilitating the assembling a bifurcated end of an angularly bent leaf spring member 37 through which closing rod 30 is connected with the low-pressure valve member 21. Spring member 37 pivots about a stationary pin or shaft 38 and has such a rigidity that it only yields to forces exceeding the control forces exerted on the low-pressure valve member 21 by diaphragm 23 with associated diaphragm spring 28.

At its upper end closing rod 30 has an oblong hole 39 through which a pin 40 is passed that is eccentrically secured in an operating handle 41 pivotally connected with a top piece 42 on the upper end of spring casing 26 and which may be rotated 180° counterclockwise from the operating position illustrated in FIG. 1 to a closing position in which it by lifting the closing rod 30 connected with diaphragm spindle 14 in the manner explained in the following, urges the diaphragm spindle upwards, thereby suspending its action on the stem, following which the stem is closed by virtue of its bias force.

The linkage of the closing rod with the low-pressure valve member 21 through spring member 37 simultaneously closes valve member 21 against seat 20.

The lower end of closing rod 30 is taken down into a substantially cylindrical bore 43 at the upper end of diaphragm spindle 14. According to the invention the upward directed mouth 44 of bore 43 is designed as a constriction with reduced diameter, and at its lower end closing rod 30 has a head 45 with a width larger than the diameter of mouth 44, but it is shaped in such a way that when closing rod 30 is inclined relative to the axis of the diaphragm spindle 14, the head may be inserted into bore 43 through the constricted mouth 44, while it is prevented from being pulled out of the bore due to its larger width in the inserted and assembled position in which closing rod 30 is coaxial with bore 43.

Figure 2:
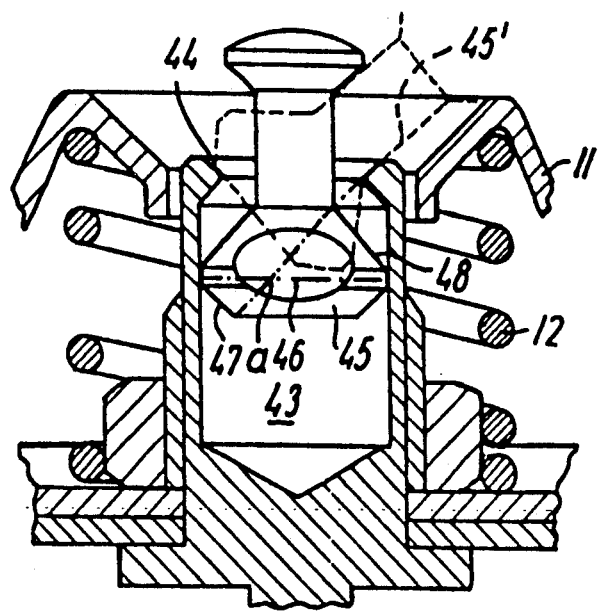

As it will most clearly be seen from the enlarged view in FIG. 2, head 45 may have the shape of a hexagonal body which perpendicular to the plane of the figure has a smaller extent than the diameter of mouth 44, but in the plane of the figure, perpendicular to the axis of the closing rod has a diagonal 46 that is longer than the diameter of mouth 44. In order to pass mouth 44 under said inclined orientation as shown in dotted lines in FIG. 2 the shortest linear distance a between two opposite, sloping sides 47, 48 that are not parallel with the diagonal 46 is smaller than the diameter of mouth 44.

If the distance a is only a little smaller than the diameter of mouth 44 the necessary inclination of the closing rod during insertion will substantially correspond to the angle formed by each of the sloping sides 47, 48 with the axis of the closing rod, in the illustrated embodiment 45°.

The reduction valve according to the invention functions in the same manner as explained in the above U.S. Pat. No. 4,550,746, but in comparison with the design disclosed in said U.S. reference the present interconnection between the closing rod and the diaphragm spindle results in a considerably simpler mounting that is easily automatized by use of robot control and also an improved security against the closing rod disengaging the diaphragm spindle during use of the valve.

I claim:

1. A two-stage reduction valve for gaseous fluids comprising a high pressure assembly with a high-pressure diaphragm acting on a valve member preferably disposed in the throat of a gas cylinder, and a low-pressure assembly consisting of a valve member likewise diaphragm-operated and which is positioned in a gas duct extending from the high-pressure assembly, said diaphragm being exposed to the pressure in the duct downstream of the valve seat of the low-pressure valve, and in which a reduction valve closing rod connected with an operating handle is restrictedly displaceably connected with a diaphragm spindle firmly connected with the high-pressure diaphragm, which diaphragm spindle in the opening position with its lower end actuates the valve member accommodated in the cylinder throat, and at its upper end has a substantially cylindrical bore displaceably receiving the lower end of the closing rod so that the high-pressure valve in one position of the operating handle and thus of the closing rod is forcibly kept closed independent of the high-pressure diaphram, while in another position of the operating handle the high-pressure valve may be moved by the high-pressure diaphragm, the closing rod being firmly connected with the valve control mechanism of the low-pressure assembly and being further so connected with the low-pressure valve member that said member is urged into the closing position when the closing rod is in the closing position, the upward facing mouth of said bore in the diaphragm spindle having over a part of its circumference a reduced diameter and the closing rod at its lower end having a head which in one direction has a width larger than said reduced diameter, and perpendicular to said direction has a smaller extent than the diameter of said mouth, and wherein the upward facing mouth is circular and has a reduced diameter, and the head of the closing rod has the shape of a hexagonal body in which a diagonal extends perpendicular to the axis of the closing rod and has a length larger than the diameter of the mouth of the bore while the shortest linear distance between two opposite sides that are not parallel to said diagonal is smaller than said diameter of the mouth such that said head may be inserted into the bore through the mouth of the bore when the closing rod is inclined in relation to the axis of the diaphragm spindle, but when in inserted position and with the closing rod coaxial with the bore it is prevented from being pulled out therefrom.

2. A two-stage reduction valve as claimed in claim 1, wherein a diaphragm seat for the low-pressure diaphragm is formed integrally with the closing rod.

3. A two-stage reduction valve as claimed in claim 1, wherein the closing rod below the diaphragm seat has a narrowing for receiving a bifurcated end of an angularly bent leaf spring member through which the closing rod is connected with the low-pressure member.

4. A two-stage reduction valve as claimed in claim 1, wherein the low-pressure diaphragm is kept firmly tightened against the diaphragm seat by a diaphragm disc positioned against the upper side of the diaphragm and in the underside of which grooves are provided to receive at least one bead protruding from the upper side of the diaphragm.

5. A two-stage reduction valve as claimed in claim 2, wherein the closing rod below the diaphragm seat has a narrowing for receiving a bifurcated end of an angularly bent leaf spring member through which the closing rod is connected with the low-pressure member.

6. A two-stage reduction valve as claimed in claim 2, wherein the low-pressure diaphragm is kept firmly tightened against the diaphragm seat by a diaphragm disc positioned against the upper side of the diaphragm and in the underside of which grooves are provided to receive at least one bead protruding from the upper side of the diaphragm.

7. A two-stage reduction valve as claimed in claim 3, wherein the low-pressure diaphragm is kept firmly tightened against the diaphragm seat by a diaphragm disc positioned against the upper side of the diaphragm and in the underside of which grooves are provided to receive at least one bead protruding from the upper side of the diaphragm.

8. A two-stage reduction valve for gaseous fluids, comprising:
- a diaphragm spindle having a bore with an upward facing mouth; and
- a closing rod having a head at its lower end, the head having in one direction a width larger than the diameter of the mouth, and perpendicular to the one direction having a smaller extent than the diameter of the mouth, the head having the shape of a hexagonal body in which a diagonal extends perpendicular to the axis of the closing rod, the diagonal having a length larger than the diameter of the mouth of the bore, while the shortest linear distance between two opposite sides that are not parallel to the diagonal is smaller than the diameter of the mouth; and
- wherein the closing rod and the diaphragm spindle are interconnected such that the head may be inserted into the bore through the mouth of the bore when the closing rod is inclined in relation to the axis of the diaphragm spindle, but when in an inserted position and with the closing rod coaxial with the bore it is prevented from being pulled out therefrom.

9. A two-stage reduction valve for gaseous fluids, as recited in claim 8, wherein the mouth of the bore has over a part of its circumference a reduced diameter, and wherein the head of the closing rod, in one direction, has a width larger than the reduced diameter.

* * * * *